United States Patent
Berglund et al.

(10) Patent No.: US 9,093,007 B2
(45) Date of Patent: Jul. 28, 2015

(54) METHOD AND DEVICE FOR GENERATING A PRESENTATION

(71) Applicants: Carl Fredrik Alexander Berglund, Malmö (SE); Michael Erik Winberg, Malmö (SE); Marcus Eriksson, Malmö (SE)

(72) Inventors: Carl Fredrik Alexander Berglund, Malmö (SE); Michael Erik Winberg, Malmö (SE); Marcus Eriksson, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 83 days.

(21) Appl. No.: 13/624,516

(22) Filed: Sep. 21, 2012

(65) Prior Publication Data

US 2014/0085524 A1    Mar. 27, 2014

(51) Int. Cl.
*H04N 5/232*    (2006.01)
*G09G 5/00*    (2006.01)

(52) U.S. Cl.
CPC .................. *G09G 5/00* (2013.01); *H04N 5/232* (2013.01); *H04N 5/23293* (2013.01)

(58) Field of Classification Search
CPC .............. H04N 5/232; H04N 5/23293; H04N 5/23238; H04N 5/222
USPC ..................... 348/333.01, 143, 744
See application file for complete search history.

(56) References Cited

U.S. PATENT DOCUMENTS

| | | | |
|---|---|---|---|
| 7,187,343 B2 * | 3/2007 | Pate | 345/1.2 |
| 2002/0167460 A1 * | 11/2002 | Baudisch et al. | 345/3.3 |
| 2002/0167531 A1 * | 11/2002 | Baudisch | 345/611 |
| 2003/0128184 A1 * | 7/2003 | Broussard | 345/156 |
| 2004/0141162 A1 * | 7/2004 | Olbrich | 353/119 |
| 2004/0227911 A1 * | 11/2004 | Salvatori et al. | 353/122 |
| 2005/0134599 A1 * | 6/2005 | Nayar et al. | 345/589 |
| 2006/0155699 A1 * | 7/2006 | Purvis et al. | 707/6 |
| 2006/0259858 A1 * | 11/2006 | Collins et al. | 715/517 |
| 2007/0076276 A1 * | 4/2007 | Jayaram et al. | 358/518 |
| 2007/0257933 A1 * | 11/2007 | Klassen et al. | 345/593 |
| 2008/0025566 A1 * | 1/2008 | Widdowson et al. | 382/103 |
| 2008/0043205 A1 * | 2/2008 | Lonn | 353/69 |

(Continued)

FOREIGN PATENT DOCUMENTS

| | | |
|---|---|---|
| EP | 1443775 | 8/2004 |
| WO | 0209086 | 1/2002 |

(Continued)

OTHER PUBLICATIONS

European Patent Office, Extended European Search Report issued in EP Application No. 12185539.9, dated Jan. 30, 2013, 9 pages.

(Continued)

*Primary Examiner* — Nicholas Giles
*Assistant Examiner* — Abdelaaziz Tissire
(74) *Attorney, Agent, or Firm* — Fish & Richardson P.C.

(57) ABSTRACT

A computer-implemented method of generating a presentation in accordance with a theme defining the graphical appearance and layout of the presentation is provided. The method comprises generating a test image for display on an external display, capturing a digital image of the test image displayed on the external display, digitally analysing the captured digital image, selecting the theme for the presentation based on the analysis, and, generating the presentation in accordance with the selected these. An electronic device and computer program product are also provided.

25 Claims, 6 Drawing Sheets

(56) References Cited

U.S. PATENT DOCUMENTS

| | | | |
|---|---|---|---|
| 2009/0153749 A1* | 6/2009 | Mixon | 348/744 |
| 2010/0031152 A1* | 2/2010 | Villaron et al. | 715/731 |
| 2010/0079653 A1* | 4/2010 | Pance | 348/333.1 |
| 2010/0165168 A1* | 7/2010 | Takahashi | 348/333.1 |
| 2010/0199195 A1 | 8/2010 | Carounanidy et al. | |
| 2010/0235768 A1* | 9/2010 | Agevik et al. | 715/763 |
| 2011/0148904 A1* | 6/2011 | Kotani | 345/589 |
| 2011/0176007 A1* | 7/2011 | Ding et al. | 348/189 |
| 2011/0271295 A1* | 11/2011 | Redmann et al. | 725/13 |
| 2012/0057061 A1* | 3/2012 | Osaka et al. | 348/333.1 |
| 2012/0108293 A1 | 5/2012 | Law et al. | |
| 2013/0113975 A1* | 5/2013 | Gabris | 348/333.1 |
| 2013/0286199 A1* | 10/2013 | Di Censo et al. | 348/143 |
| 2014/0071168 A1* | 3/2014 | Berglund et al. | 345/660 |
| 2014/0096006 A1* | 4/2014 | Berglund et al. | 715/732 |

FOREIGN PATENT DOCUMENTS

| | | |
|---|---|---|
| WO | 2004104766 | 12/2004 |
| WO | 2008020340 | 2/2008 |

OTHER PUBLICATIONS

Response filed in connection with EP Patent Application No. 12185539.9, dated Jul. 31, 2014, 14 pages.

Office Action issued in Canadian Application No. 2,827,425 on Mar. 18, 2015; 3 pages.

\* cited by examiner

METHOD AND DEVICE FOR GENERATING A PRESENTATION

TECHNICAL FIELD

The disclosed embodiments relate to an electronic device and a method of generating a presentation. In particular, the disclosed embodiments relate to a method of generating a presentation in accordance with a theme defining the graphical appearance and layout of the presentation.

BACKGROUND OF THE INVENTION

Typically, when designing a presentation using conventional presentation tools, the author will design the presentation on an electronic device which has a display other than that with which the presentation will eventually be displayed to the audience. For example, presentations are often designed on a desktop personal computer or on a tablet device, both of which have high quality and highly reliable displays. However, when the presentation is given to an audience, it is usually displayed by a projector or on a much larger, but low quality, monitor.

When the presentation is given to an audience, the quality of the display is key to audience enjoyment, understanding, interest and participation. A bad projector can ruin the best designed presentation. For example, a dim projector or a poorly adjusted monitor may render the presentation almost impossible to read, and carefully matched colours and contrast can be easily distorted. Other factors such as the ambient light in the room, which may be coloured, and the surface on which the display is projected can also significantly affect the readability of the presentation.

It is known to calibrate the settings of the display device in order to correct for global deficiencies in the display of the presentation, however this may only alleviate certain ones of the potential issues and only to a certain extent. There is a need to address the issues caused by both poor quality projectors and the presentation environment, in order to improve the readability of a presentation and therefore improve audience enjoyment, understanding, interest and participation.

BRIEF DESCRIPTION OF THE DRAWINGS

Examples of the present invention will now be described in detail with reference to the accompanying drawings, in which.

DESCRIPTION OF EMBODIMENTS

According to one aspect of the present disclosure, there is provided a computer-implemented method of generating a presentation in accordance with a theme defining the graphical appearance and layout of the presentation. The method comprising: generating a test image for display on an external display; capturing a digital image of the test image displayed on the external display; digitally analysing the captured digital image; selecting the theme for the presentation based on the analysis; and, generating the presentation in accordance with the selected theme. In this way, the readability of a presentation is improved together with audience enjoyment, understanding, interest and participation. Deficiencies in display of the presentation are compensated for such that a visually impressive presentation can be delivered to the audience.

The presentation may comprise one or more content items, and the theme may define the graphical appearance and layout of each content item.

The presentation may comprise a plurality of content items of the same type, and the theme may define the graphical appearance and layout of each content item independently of other content items of the same type. In this way, aspects of the presentation can be tailored independently.

The presentation may not be associated with a previously selected theme, thus the theme of the presentation has not been predetermined.

Selecting a theme may comprise modifying a theme previously selected for the presentation. The selection of the theme optimises the previously chosen theme based on the analysis to optimise the look and feel of the previously chosen theme. The theme may have been previously selected by a user or automatically.

The theme may comprise one or more characteristics, wherein each characteristic defines an aspect of the graphical appearance and layout of the presentation, and wherein the one or more characteristics are selected from the group consisting of: type face, font weight, font size, font colour, image contrast, image saturation, font contrast, font saturation, background colour, background effect, slide transition, and slide animation. These characteristics may in certain circumstances be manually adjusted but it would probably be quite complicated and take quite some time to get right. By selecting a theme based on analysis of a captured digital image, the computer-implemented method is able to make the process simpler and more usable for the end user.

The test image may comprise one of: a black and white image; red, blue and green regions; one or more geometric shapes; and, a marker positioned substantially in each corner of the test image.

Digitally analysing the captured digital image may comprise determining image sharpness of the captured digital image. If the analysis determines that the image sharpness is below a predetermined threshold value, the selected theme may comprise a large font size suitable for the text to be readable.

If the analysis determines that image contrast of the captured digital image is below a predetermined threshold value, the selected theme comprises one more characteristics selected from the group consisting of: a bold font weight, a non-light font weight, high image contrast, high font contrast, a light background with a dark font, and a large font size.

If the analysis determines that one or more colour discrepancies between the captured digital image and the test image are above a predetermined threshold value, the selected theme may be based on the one or more colour discrepancies.

Capturing a digital image may comprise using an internal camera. The method may further comprise displaying the test image by means of a projector.

According to another aspect of the present disclosure, there is provided an electronic device for generating a presentation in accordance with a theme defining the graphical appearance and layout of the presentation, the device comprising: one or more processors; and, memory comprising instructions which, when executed by one or more of the processors, cause the electronic device to: generate a test image for display on an external display; capture a digital image of the test image displayed on the external display; digitally analyse the captured digital image; select the theme for the presentation based on the analysis; and, generate the presentation in accordance with the selected theme.

The presentation may comprise one or more content items, and wherein the theme defines the graphical appearance and layout of each content item. The presentation may comprise a plurality of content items of the same type, and wherein the theme defines the graphical appearance and layout of each content item independently of other content items of the same type. The presentation may not be previously associated with a theme.

Selecting a theme may comprise modifying a theme previously associated with the presentation. The theme may comprise one or more characteristics, wherein each characteristic defines an aspect of the graphical appearance and layout of the presentation, and wherein the one or more characteristics are selected from the group consisting of: type face, font weight, font size, font colour, image contrast, image saturation, font contrast, font saturation, background colour, background effect, slide transition, and slide animation.

The test image may comprise one of: a black and white image: red, blue and green regions; one or more geometric shapes; and a marker positioned substantially in each corner of the image.

The analysis may comprise determining image sharpness of the captured digital image. If the analysis determines that the image sharpness is below a predetermined threshold value, the selected theme may comprise a large font size suitable for the text to be readable. If the analysis determines that the captured digital image has contrast below a predetermined threshold value, the selected theme is comprises one or more characteristics selected from the group consisting of: a bold font weight, a non-light font weight, high image contrast, high font contrast, a light background with a dark font, and a large font size. If the analysis determines that one or more colour discrepancies between the captured image and the test image are above a predetermined threshold value, the selected theme compensates for the one or more colour discrepancies.

The device may comprise a camera, and the device may be adapted to capture the digital image using the camera. The device may be adapted to display the test image on an external display.

According to another aspect of the present disclosure, there is provided a computer program product for generating a presentation in accordance with a theme defining the graphical appearance and layout of the presentation, the computer program product comprising memory comprising instructions which when executed by one or more of the processors of an electronic device cause the electronic device to: generate a test image for display on an external display; capture a digital image of the test image displayed on the external display; digitally analyse the captured digital image; select the theme for the presentation based on the analysis; and, generate the presentation in accordance with the selected theme.

The present disclosure is described in the context of an electronic device and particularly a portable electronic device. Examples of portable electronic devices include mobile, or handheld, wireless communication devices such as pagers, cellular phones, cellular smart-phones, wireless organizers, personal digital assistants, wirelessly enabled notebook computers, wirelessly enabled tablet computers and so forth. The portable electronic device may also be a portable electronic device without wireless communication capabilities, such as a handheld electronic game device, digital photograph album, tablet computer, digital camera, or other device.

Figure 1:
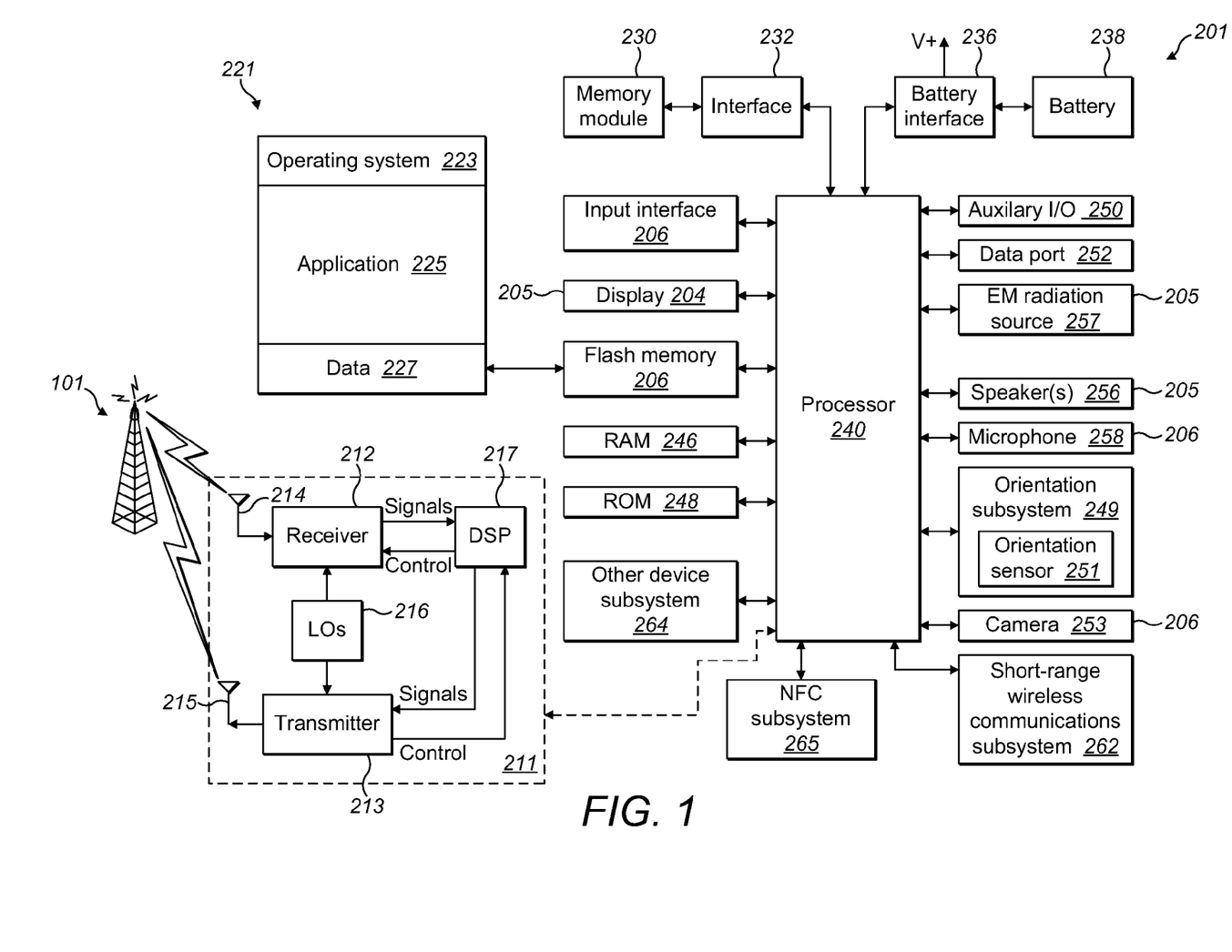
FIG. 1 is a block diagram illustrating an electronic device in accordance with example embodiments of the present disclosure.

Reference will now be made to FIG. 1 which illustrates an example electronic device 201 in which example embodiments described in the present disclosure can be applied. It will be appreciated that one or more of the electronic devices 201 suitable for use with the present disclosure may be of a type which differs from the electronic device 201 of FIG. 1 and that some of the features, systems or subsystems of the electronic device 201 discussed below with reference to FIG. 1 may be omitted from electronic devices 201 which implement the principles of the present disclosure.

In the illustrated example embodiment, the electronic device 201 is a communication device and, more particularly, is a mobile communication device having data and voice communication capabilities, and the capability to communicate with other computer systems; for example, via the Internet. It will, however, be appreciated that the electronic device 201 may take other forms, including any one of the forms listed above.

Depending on the functionality provided by the electronic device 201, in various example embodiments the electronic device 201 may be a multiple-mode communication device configured for both data and voice communication, a mobile telephone, such as a smartphone, a wearable computers such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a frame 312 (FIG. 3) which surrounds the display 204. In such example embodiments, the frame 312 (FIG. 3) may be referred to as an active frame since it is capable of acting as an input interface 206. In at least some example embodiments, the touch-sensitive overlay may extend to the sides of the electronic device 201.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analogue-to-digital (ND) conversion. ND conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analogue (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analogue output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 may, in at least some example embodiments, include a near field communications (NFC) subsystem 265. The NFC subsystem 265 is configured to communicate with other electronic devices 201 and/or tags, using an NFC communications protocol. NFC is a set of short-range wireless technologies which typically require a distance of 4 cm or less for communications. The NFC subsystem 265 may include an NFC chip and an NFC antenna.

The electronic device 201 may include a microphone and/or one or more speakers. In at least some example embodiments, an electronic device 201 may include a plurality of speakers 256. For example, in some example embodiments, the electronic device 201 may include two or more speakers 265. The two or more speakers 256 may, for example, be disposed in spaced relation to one another. That is, in at least some example embodiments, the electronic device 201 may include a first speaker and a second speaker and the first speaker and the second speaker may be spatially separated from one another within the electronic device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some example embodiments, each speaker 256 may be associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some example embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 and/or the housing of the electronic device 201. In such example embodiments, the direction of capture of the camera is always predictable relative to the display 204 and/or the housing. In at least some example embodiments, the camera may be provided in a central location relative to the display 204 to facilitate image acquisition of a face.

In at least some example embodiments, the electronic device 201 includes an electromagnetic (EM) radiation source 257. In at least some example embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some example embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. The short-range communication subsystem 262 may be used to provide a common user interface (UI) mode between the electronic device 201 and another electronic device 201 which may, in at least some example embodiments, be an electronic device 201 which is the same or similar to the electronic device 201 discussed with reference to FIG. 1. In at least some example embodiments, the short-range communication subsystem 262 is a wireless bus protocol compliant communication mechanism such as a Bluetooth® communication module to provide for communication with similarly-enabled systems and devices.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225.

The software applications 225 on the electronic device 201 may also include a range of additional applications, including for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

As discussed above, electronic devices 201 may take a variety of forms. For example, in at least some example embodiments, one or more of the electronic devices which are configured to enter a common user interface mode with another electronic device may be a smartphone.

Figure 2:
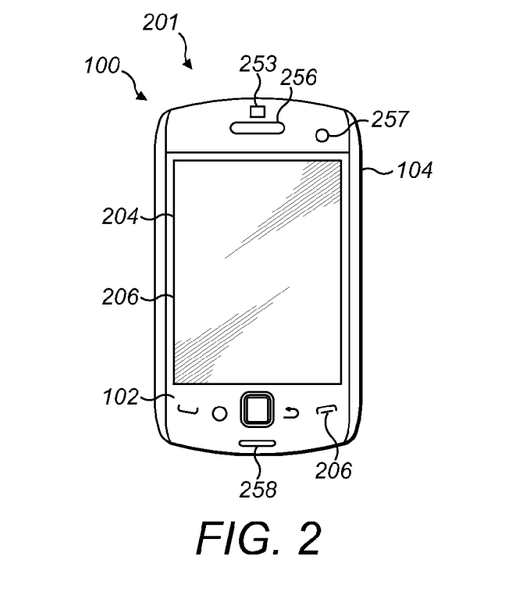
FIG. 2 is a front view of a smartphone in accordance with example embodiments of the present disclosure.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 may include the components discussed above with reference to FIG. 1 or a subset of those components. The smartphone 100 includes a housing 104 which houses at least some of the components discussed above with reference to FIG. 1.

In the example embodiment illustrated, the smartphone includes a display 204, which may be a touchscreen display which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone also includes a speaker 256. In the example embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 2 includes a single speaker 256, in other example embodiments, the smartphone 100 may include a greater number of speakers 256. For example, in at least some example embodiments, the smartphone 100 may include a second speaker 256 which is disposed vertically below the display 204 when the smartphone is held in a portrait orientation where its height is longer than its width (i.e. the orientation illustrated in FIG. 2).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of and/or surrounding the front side of the smartphone 100.

The example smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of and/or surrounding the front side of the smartphone 100. Such electromagnetic radiation (or the projection of electromagnetic radiation onto objects) may be captured on images obtained by the camera 253.

Figure 3:
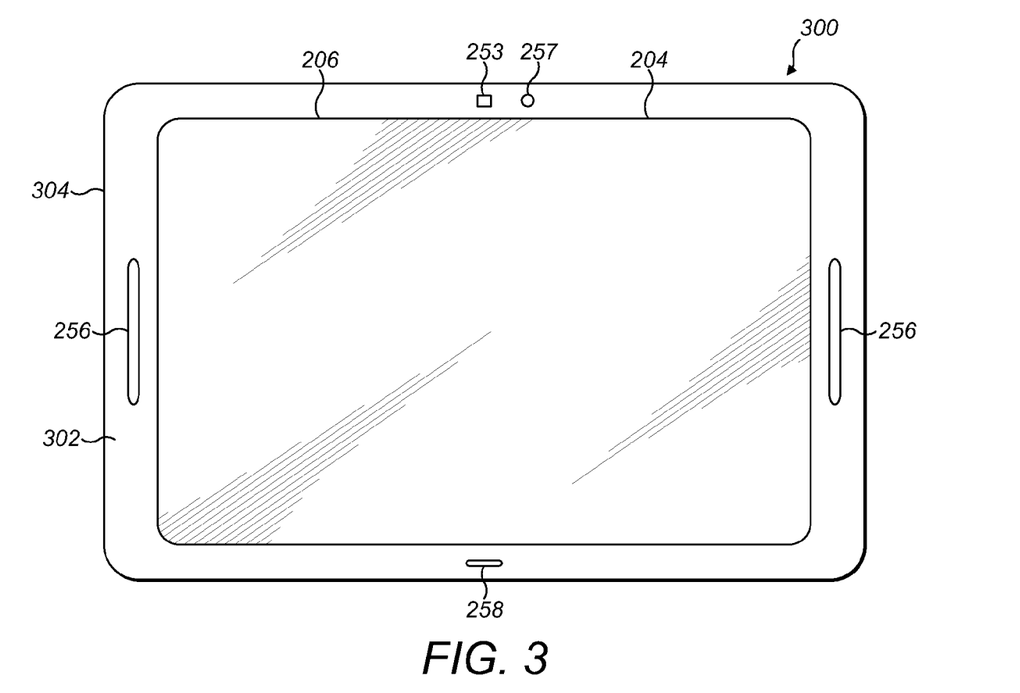
FIG. 3 is a front view of a tablet computer in accordance with example embodiments of the present disclosure.

In at least some example embodiments, the one or more of the electronic devices 201 may be a tablet computer. Referring now to FIG. 3, a front view of an example electronic device 201 which is a tablet computer 300 is illustrated.

The tablet computer 300 of FIG. 3 may include many of the same features and components of the smartphone 100 of FIG. 2. However, the tablet computer 300 of FIG. 3 is generally larger than the smartphone 100 of FIG. 2. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

A frame 312 surrounds the display 204. The frame 312 is portion of the housing 304 which provides a border around the display 204. In at least some example embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The example tablet computer 300 includes a plurality of speakers 256. In the example embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204. Both speakers 256 are disposed on the front side 302 of the tablet computer 300.

The example tablet computer 300 also includes a microphone 258. In the example illustrated, the microphone 258 is vertically disposed below the display 204 when the tablet computer is held in the landscape orientation illustrated in FIG. 3. The microphone 258 may be located in other locations in other example embodiments.

The example tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of and/or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of and/or surrounding the front side 302 of the tablet computer 300. Such electromagnetic radiation (or the projection of electromagnetic radiation onto objects) may be captured on images obtained by the camera 253.

Public speakers giving talks in the business and education fields often make use of visual aids. Ever since the advent of Microsoft®'s PowerPoint® program, a common visual aid has been a slide-based presentation consisting of a set of 'slides' which are displayed to the audience. The term 'slide' in the present context is a metaphor for the photographic slides—small glass or plastic transparencies through which light was projected—that, prior to the digital information age, were commonly used to display a sequence of images to audiences. The slides generated and shown via presentation software are actually digital information comprising text and images. Each slide generally acts as a visual aid to a portion of the talk given by the speaker. The speaker will advance through the set of slides as the talk progresses so that the audience sees the visual aid most relevant to that portion of the talk. The set of slides is usually referred to as a 'presentation' or as a 'slide-based presentation;' the two terms will be used interchangeably throughout the present description.

Generally, the presentation is displayed to the audience on an external display that either reflects or emits light. Often a projector is used to project each slide onto a surface the audience can see, such as a reflective screen (designed for the purpose) or even a bare wall; the audience sees each slide as light reflected by the external display (the screen or wall). Alternatively, the presentation is displayed using a large monitor—again suitable for viewing by the audience members—such as an LCD, LED, or plasma monitor; in such case, the audience sees each slide as light emitted by the external display (the monitor). An additional element of the presentation is typically a set of notes for the presenter. These notes are not displayed to the audience but may be shown on the electronic device so that only the presenter can see them.

Although the presentation may be displayed using a projector or a monitor, the content of the presentation itself is often provided to the projector or monitor using a separate electronic device. It will be understood that the device may alternatively be integral with the projector or monitor. The separate electronic device may be in the form of a personal computer, smartphone or tablet device such as those described above. The speaker may control the presentation using an input device integral with the separate electronic device or using a separate remote control.

A presentation program is a computer software package which is often used to generate and present a presentation. The functionality of such a program typically includes: the ability to load and store presentations; the ability to edit presentations by adding, deleting, and altering elements (text, images, and other features such as bullets, hyperlinks, and buttons to trigger sounds or videos) and modes of animating slides (by, for example, revealing, moving, or hiding elements) or transitioning between consecutive slides; and the ability to show the presentation (by means of an external display) in either a fully automated manner, a semi-automated manner, or a fully speaker-controlled manner.

Figure 4:
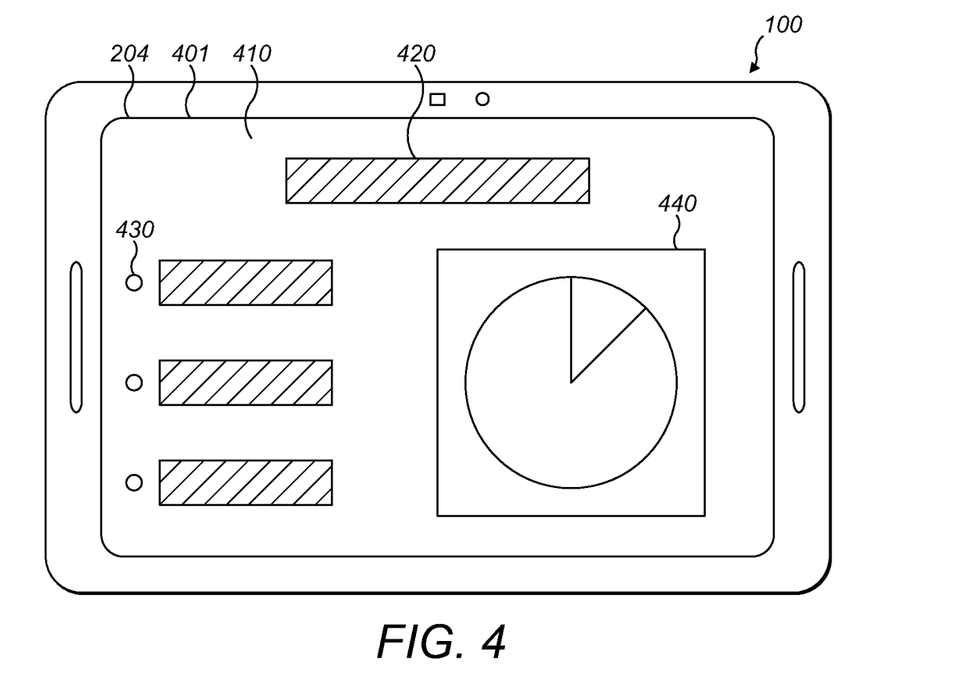
FIG. 4 is an illustration of a slide-based presentation displayed on a tablet computer.

FIG. 4 illustrates an electronic device 100 displaying on a display 204, a slide 401 of a presentation. The slide 401 of a presentation can be described as an arrangement of elements, where the elements displayed are used to deliver information or to add to the aesthetics of the slide or both. For example, the slide 401 displayed in FIG. 4 contains a background 410, a title 420, bullet points 430 and an image 440. Each of these elements may be customisable in the presentation program used to generate the presentation, for example the background 410 may be altered to a different colour, pattern, or picture; the title 420 and bullet points 430 may display different text in different font sizes and colours; and the image 440 may be a graphical representation of data, like a pie chart, or may serve a more aesthetic purpose, such as providing a visual cue.

In a slide-based presentation, a presentation is made up of many slides 401, each of which may provide a different arrangement of elements. Although slide-based presentations are the most common type used, the proposed solution is envisioned to be applicable to more complex presentations as well. For example, a presentation may not be made up of a set of discrete slides, but may instead be made up of one large, continuous arrangement of elements that covers a larger area than the display 204, and which may be traversed to display different regions of the arrangement of elements at a time. In another example embodiment, the presentation may be dynamically generated, where the arrangement of elements is automatically generated based on real-time user input and context-based intelligence, and therefore the 'slide' is simply the current arrangement of elements being presented.

In a slide-based presentation, a 'theme' defines the layout of the content elements on the slide as well as the graphical appearance of each content element. For example, the theme may define that if a slide is to have a title 420, it is to be placed along a central vertical axis of the slide and substantially near to the top when the slide is displayed. The theme may also define that the title 420 may have a particular font face, font size, font weight and colour and may or may not be placed in front of a coloured background region.

Examples of the variable characteristics of a theme include:
  font face, size and colour;
  contrast and saturation of fonts;
  contrast and saturation of images;
  background colour;
  background effect, for example an animated background effect such as a live wallpaper; and,
  slide transitions and animations, for example, how text, bullet points and images move into and out of focus both within a single slide when one slide has multiple bullets or paragraphs and between different slides.

It will be understood that the above are merely examples and it will be clear that there are any number of characteristics possible that may define the graphical appearance and layout of a presentation. The characteristics of the elements can be set independently. For example, single paragraphs and images can have a different appearance. Paragraphs with different settings can be rendered on the same slide.

Figure 5:
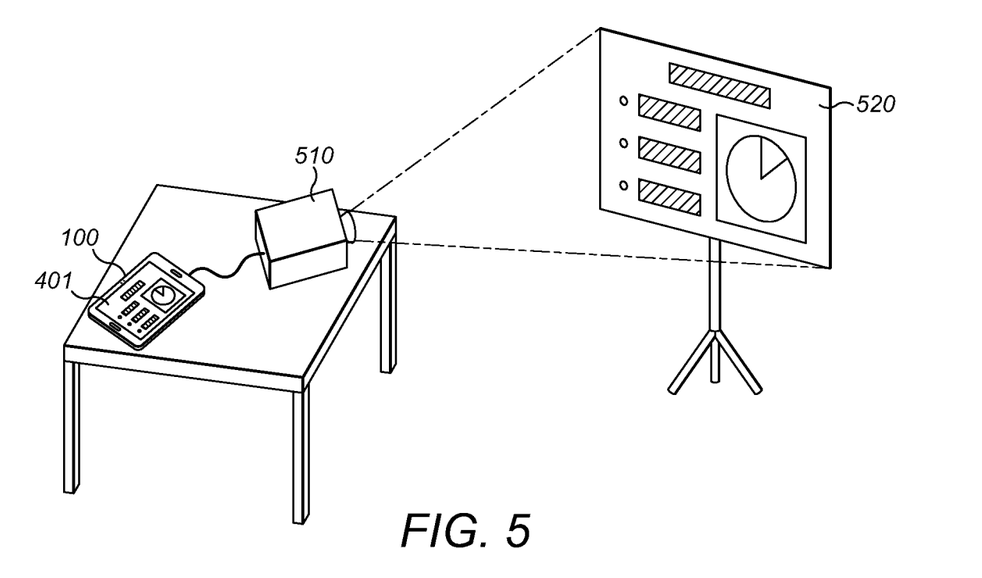
FIG. 5 is an illustration of an electronic device connected to a projector displaying a presentation.

FIG. 5 shows an electronic device 100 being used to present a presentation 401. The electronic device 100 is connected to external hardware 510 that can display the presentation larger than an internal display 204 of the electronic device 100. The connection may be made by a physical connection (as shown) or may be connected wirelessly to external hardware 510. The external hardware 510 may, for example, be a large monitor, or a projector 510 for displaying the presentation 401 on a reflective screen 520, or a distribution system for broadcasting the presentation to users remotely.

As described above, there may be a number of factors which affect the display of the presentation to the audience, for example, a bad-quality (or poorly adjusted) projector or monitor, ambient light or the reflective properties of a surface on which the slides are projected. The example embodiments described herein seek to prevent those issues from affecting the visual appeal of the presentation. This is done by displaying a predetermined test or calibration image and capturing how this is displayed to the audience. The test image contains components that make it possible to identify the quality of the display in terms of certain parameter. The test image, the parameters, and the analysis of quality will be described in more detail below.

Depending on the values of the parameters measured, a presentation theme is selected (from a collection of predetermined themes) which, rather than globally compensating for the deficiencies in the display (for example, in the manner of classic colour compensation), sets the theme of the presentation so that a visually impressive presentation is produced that factors in how the presentation will look to the audience. Instead of selecting a theme from a collection of predetermined themes, a previously selected theme may also be modified to improve the visual look and feel of the presentation.

Figure 6:
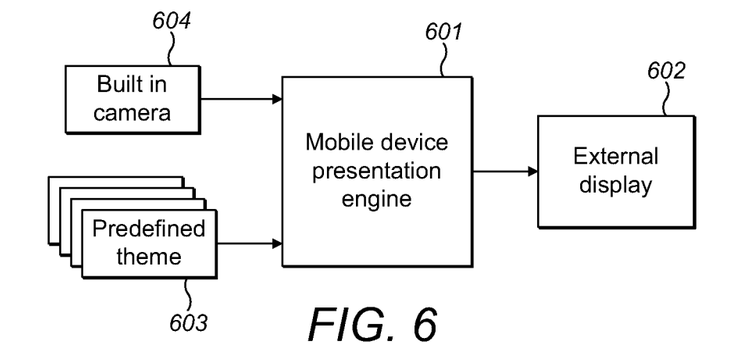
FIG. 6 is a system overview.

FIG. 6 illustrates a system overview of an example embodiment. A mobile device presentation engine 601 generates a presentation for display and passes the finalised presentation to an external monitor or projector 602 which then displays the presentation to the audience. Additionally, the mobile device presentation engine 601 may pass the external monitor or projector 602 a test image for display. The mobile device presentation engine 601 communicates with a camera, which may be integral with the electronic device, in order to capture the displayed test image. In one embodiment, the mobile device presentation engine 601 selects from a plurality of predetermined themes 603 and then generates the presentation for display in accordance with that theme and passes the finalised presentation to an external monitor or projector 602 which then displays the presentation to the audience.

Figure 7:
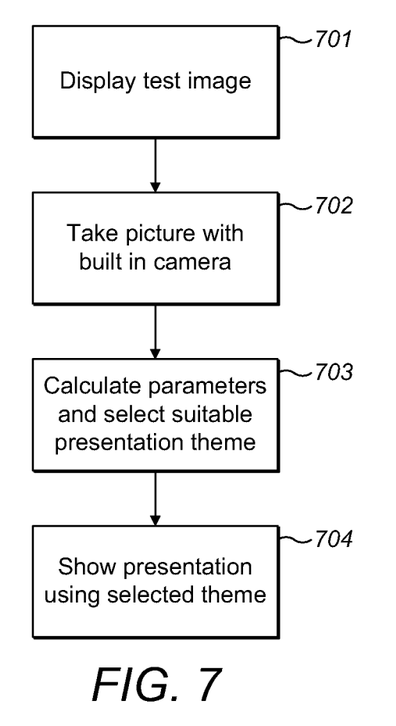
FIG. 7 is a flow diagram of the algorithm carried out according to example embodiments of the present disclosure.

A flow diagram illustrating the above concepts from the perspective of the overall system is illustrated in FIG. 7. Firstly, at step 701, the test image is displayed. At step 702, a picture is taken using a built in camera of the device. At step 703, the test parameters are calculated and a suitable presentation theme is selected. At step 704, the stored presentation is shown using the selected theme.

Figure 8:
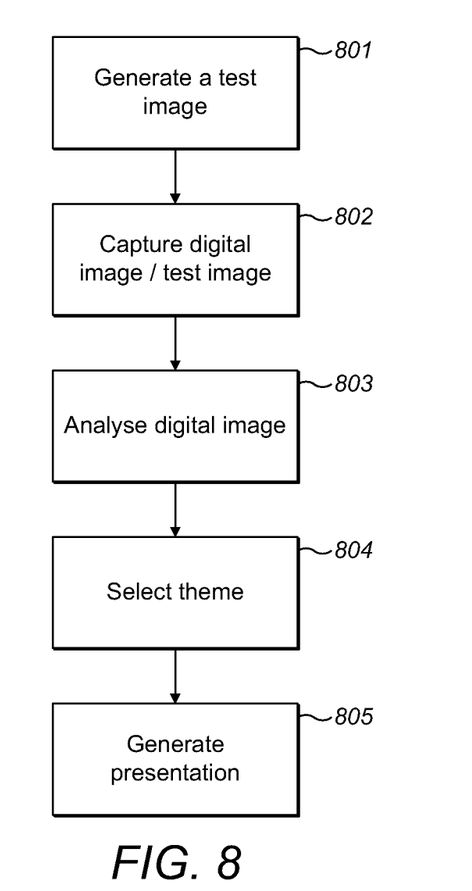
FIG. 8 is a flow diagram of the steps carried out by the mobile device presentation engine according to example embodiments of the present disclosure.

FIG. 8 illustrates a flow diagram of the above concepts from the perspective of the mobile device presentation engine 601. The test image is first generated by the engine for display at step 801. At step 802, the engine captures the test image in the form of a digital image. The digital image is then analysed to determine certain parameters, at step 803. Based on the analysis of the image, a theme is then selected for the presentation, at step 804. This may include modifying an existing theme or selecting a theme from a group or set of themes. The engine 601 then generates the presentation for display, at step 805.

In a similar representation to FIG. 5 which is described above, FIG. 9 depicts an electronic device 100 being used to capture a digital image of the test image displayed on a reflective screen 520 using a projector 510. The illustration shows a rear internal camera of the device taking a digital image of the projection as it is displayed. The digital image is subsequently used in the analysis process to determine the state of the display.

Figure 9:
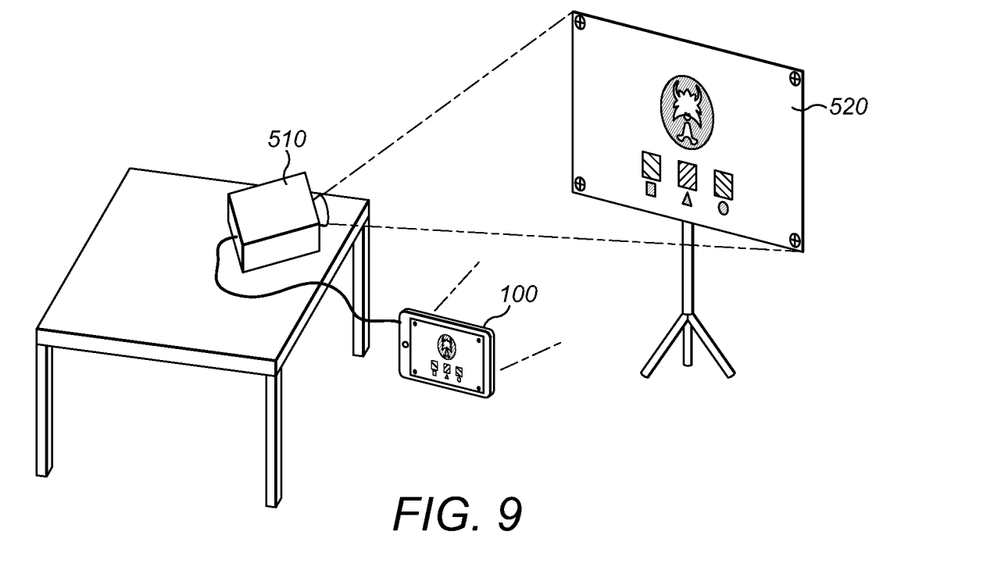
FIG. 9 is an illustration of an electronic device connected to a projector displaying a test image according to example embodiments of the present disclosure; and, FIG. 10 is an illustration of a test image according to example embodiments of the present disclosure.

Although it is depicted that the rear camera of the device may be used to capture the image, it will be understood that the front facing camera could also be used and alternatively an independent camera which is in communication with the device either using a wired or wireless communication connection It is also contemplated that a stereoscopic camera may be used.

Figure 10:
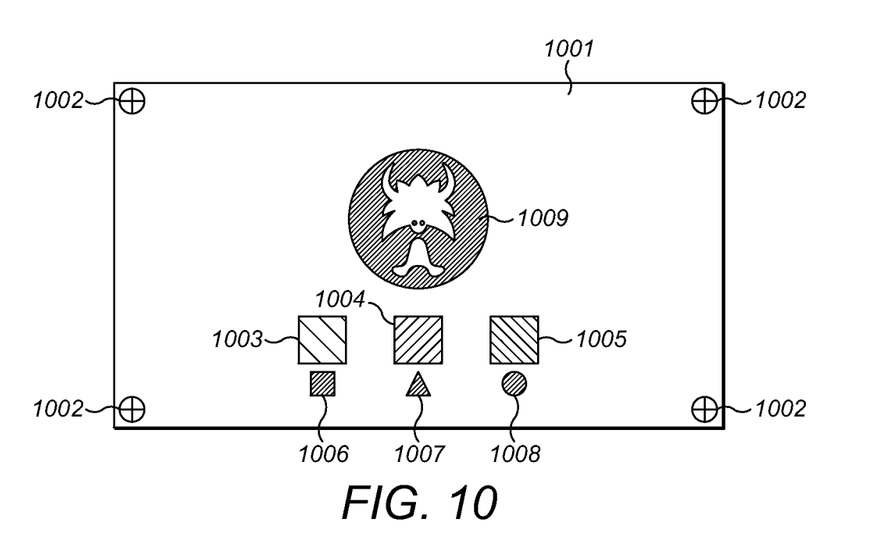

It has been described above, that a test image may be analysed to determine the quality of the display and the potential affect it will have on a presentation subsequently displayed. FIG. 10 illustrates an exemplary test image which may be generated by the method described above in the context of FIG. 8. The test image itself is intended to be of substantially the same size as the presentation such that the display can be measured across the range needed. The exemplary test image 1001 may include the following features.

Firstly, the test image 1001 may include four markers 1002 placed in all corners, or substantially near all corners, in order to detect if the output is clipped and also to detect the aspect ratio (i.e., the width:height ratio) of the display region. Secondly, the test image 1001 may include three coloured regions 1003, 1004 and 1005 in order to measure colour quality and discrepancies between the observed output and the expected output. In FIG. 10, the different coloured regions 1003, 1004 and 1005 are illustrated through hatching. Preferably, the three regions 1003, 1004 and 1005 are red 1003, green 1004 and blue 1005 to measure primary colour quality. The regions 1003, 1004 and 1005 are illustrated as square, however this may not necessarily be the case.

Further, the test image 1001 may include a number of basic shapes 1006, 1007 and 1008. In a preferred example, these shapes may be geometric shapes and even more preferably may be regular polygons. Examples of contemplated shapes include a square 1006, an equilateral triangle 1007 and a circle 1008. These shapes may be used to measure if the output is stretched when displayed. The shapes may also be the coloured regions, although this example is not shown. Other elements of the image may be used to detect skew or stretch, and so these regular polygons or shapes are optional.

The test image 1001 may further comprise an image 1009 with only black and white pixels, which may be used to measure the ratio between minimum and maximum brightness, i.e. the contrast.

The analysis of the captured digital image aims to determine how these aspects of the test image 1001 appear when displayed. In addition to analysing the parameters of the image, the analysis may also determine the image sharpness or focus. This aspect heavily impacts how readable text is, and text readability is arguably the most important factor in making a presentation audience-friendly.

The analysis of the captured digital image carried out by the presentation engine utilises computer vision techniques and algorithms in order to measure certain parameters of the test image. It is important to note than any techniques or algorithms may be used to determine the quality of the display. Exemplary computer vision techniques will now be described which merely show a number of ways in which the parameters may be identified. Other methods of analysis are envisaged but not described.

Firstly, the engine may need to identify the test image. The test image should be as "unique" as possible so the algorithm does not find false positives. A common method of identification is to use Scale Invariant Feature Transform (SIFT) or Speeded Up Robust Feature SURF (SURF). However, these algorithms are quite slow. An alternative and faster method may be to use Features from Accelerated Segment Test (FAST) to detect the rectangle of the projected image or TV screen. If the camera is pointed directly at the projected image or monitor, it should be bright enough so that the outline of the image is easily identified by FAST. FAST will usually detect more than one rectangle, and the engine will then need to determine which is the correct one. Rectangles that are very small or have extreme aspect ratios can be instantly discarded, although the engine may end up with more than one.

The user of the device may need to ensure that all parts of the test image are picked up by the camera for good results. To do this, the user may be presented with the detected image for confirmation once the engine has identified the test image from the captured digital image. If the test image has not been identified correctly, the user may be requested to restart the process or move locations when capturing the image.

Once a set of potential test images has been found, the engine may need to project the images from 3D to 2D. This can be done by calculating the homography of the subset of the camera feed that identified as the test image.

Further, it may be possible to use marker detection, which is commonly used in augmented reality applications. It is enough that the engine detects a part of the test image, since it is in the same plane as the rest of the image.

Once the engine has identified the test image in 2D, the engine is operable to determine the different parts of the test image by using object detection. Contemplated object detection algorithms include those described as part of OpenCV.

Once the engine has identified all of the different parts of the test image, the engine can analyse the individual components to determine the quality of the monitor or projected image. The following are examples of this analysis.

The edges of the monitor or projected image have been determined using the steps above. Therefore if there is a corner marker missing, then the engine is able to determine that the image is clipped or obscured. If the image is obscured, the user should address this before running the algorithm. To address the clipping, the engine is operable to adjust the output in small increments until the image is no longer clipped. The user may have to let the algorithm run for a few seconds while it takes an image, analyses it, adjusts settings and then start over until the calibration is complete. It may also be possible to measure the width or height of the image in the middle of the test image and determine exactly how much the engine needs to calibrate and perform the calibration in just one step.

To determine if the output is stretched, the engine can first make sure that the image isn't clipped and then look at the aspect ratio. If the aspect ratio is wrong, then the engine can adjust the output to get a 4:3 or 16:9 image as desired.

Contrast can be determined by calculating a histogram of luminance values of pixels of the captured image. The difference between the darkest and the brightest pixels is used to determine the contrast. The engine may have to take exposure time into consideration when determining the contrast.

The three squares of the test image that are red 1003, green 1004 and blue 1005 are used to determine colour quality. To determine the colour quality, the engine may calculate the average of all pixels in a square and look at the Red, Green and Blue (RGB) values of the pixels to determine how bright the three colours are. The white parts of the test image can be used to calibrate the white balance and ensure that the RGB values from the camera are realistic enough.

When measuring the image sharpness, if the blurriness is above a certain threshold then the algorithms described here may fail. However, this shouldn't be a problem since this will be very obvious to the presenter, and the projector can then be manually adjusted. In this situation, a warning may be presented to the user. Once the display is sharp enough, the algorithms can take care of making sure the text is readable. For instance, the engine could measure the readability by looking at the intensity of the edges of the square or other shape that is in the reference image. If the edges are not sharp, they may appear to be a gradient. The blurriness is based on the length of the gradient.

As was described above, a stereoscopic camera may be used to detect the test image. The engine may use this camera to detect the distance from the device to the displayed test image and therefore calculate the actual physical size of the monitor or projected image.

The engine has now determined the characteristics of the test image through computer vision techniques. The next step is to select or modify the theme for the presentation. Exemplary variable aspects of the theme are described above and as mentioned, other aspects are contemplated. Examples of how the theme may be selected or modified based on the identified characteristics of the test image will now be described.

It is worth noting that individual content elements may be given certain characteristics as part of the theme, independently of other content elements even if they are of the same type. For example, paragraphs with different settings can be rendered on the same slide. Various uses for this are contemplated. In one example, ambient light affects only the bottom half of the display. The text elements which the theme determines should be placed there may be given a darker font colour or a larger weight so that the text elements are more readable for the audience.

In a first example, if the contrast is detected to be low, or the projector or monitor is determined to have poor brightness, then the theme may be selected or modified in the following ways.

Firstly, to compensate for poor contrast, the theme may increase contrast of images, favour heavier fonts, and/or favour highly contrastive background and text colours (such as black on white or white on black). For example, a selected theme may favour boldfaced text to non-boldfaced text; a previously selected theme may replace a fontface having thin strokes with a font having thicker strokes.

Further, a large font size can be used in the theme or the font size of an existing theme can be increased. By increasing the font size of a previously selected theme, the layout of the theme and the slide transitions may need to be changed, since fewer elements can be shown on the external display at the same time. Similarly, a theme may be selected with a large font size and a layout and slide transitions that take account of the large font size.

In a second example, the image analysis looks at the red, green and blue regions of the test image. The subsequent analysis determines the brightness of the three colours, as described above. The engine may be operable to use this information to select a theme where the colours can be accurately represented. For instance, a theme which is predominantly yellow might not work very well if the red or green colour channel is reproduced poorly. In a further example, the engine may determine that the colours that will be displayed are not sufficiently distinguishable. For example, the presentation may include a chart which has graph lines of red and orange. The analysis of the captured image may calculate that the two colours may not be distinguishable, because the green is not bright enough resulting in an orange that tends closer to red. The engine may replace the orange graph line with a blue graph line in order to distinguish adequately between the colours.

In a third example, the analysis may have determined that the image is blurry and out of focus. If it is not possible to solve this problem by adjusting (or moving) the projector, then the theme could be selected (or adjusted) to use a large (or larger) font size. The large font allows the text to be readable, even though it is blurry.

In a further example, the markers of the test image may be used by the analysis to determine the aspect ratio. The aspect ratio, for example 4:3 or 16:9, will affect how the layout of the theme will look. Based on the determined aspect ratio, the engine may be operable to select a theme from the collection of predetermined themes which is optimised for use on that aspect ratio. Additionally, the engine may be operable to adapt the layout to fit the current aspect ratio in two ways. The first is small adjustments for example, if the bounding rectangle for a paragraph becomes narrower then line breaks will change to accommodate for the smaller width and the title might have to use a smaller font. The engine may also use the predetermined themes as the base for the layout and then do small adjustments for other ratios would probably work very well, for example, a 16:9 theme may be used as a template with small optimizations to fit a 16:10 ratio.

The embodiments described above are merely illustrative of particular implementations and are not meant to be restrictive. Various adaptations, modifications, and combinations of the described embodiments can be made while remaining within the scope of the claims appended.

The invention claimed is:

1. A computer-implemented method of generating a presentation in accordance with a theme, wherein the presentation comprises at least one arrangement of graphic elements, and the theme defines the graphical appearance and layout of the graphic elements of the presentation, the method comprising:
generating a test image for display on an external display;
capturing a digital image of the test image displayed on the external display;
digitally analysing the captured digital image to identify properties of the external display;
selecting the theme for the presentation based on the analysis, wherein the selected theme individually alters the graphical appearance and layout of one or more graphic elements of the presentation, to improve the visibility of individual graphic elements when displayed on an external display with the identified properties; and,
generating the presentation in accordance with the selected theme.

2. The method according to claim 1, wherein the presentation comprises a plurality of graphic elements of the same type, and wherein the theme defines the graphical appearance and layout of each graphic element independently of other content items of the same type.

3. The method according to claim 1, wherein the presentation is not associated with a previously selected theme.

4. The method according to claim 1, wherein selecting a theme comprises modifying a theme previously selected for the presentation.

5. The method according to claim 1, wherein the theme comprises one or more characteristics, wherein each characteristic defines an aspect of the graphical appearance and layout of one or more graphic elements of the presentation, and wherein the one or more characteristics are selected from the group consisting of: type face, font weight, font size, font colour, image contrast, image saturation, font contrast, font saturation, background colour, background effect, slide transition, and slide animation.

6. The method according to claim 1, wherein the test image comprises one of: a black and white image; red, blue and green regions; one or more geometric shapes; and a marker positioned substantially in each corner of the test image.

7. The method according to claim 1, wherein digitally analysing the captured digital image comprises determining image sharpness of the captured digital image.

8. The method according to claim 7, wherein, if the analysis determines that the image sharpness is below a predetermined threshold value, the selected theme comprises a large font size suitable for the text to be readable.

9. The method according to claim 1, wherein, if the analysis determines that image contrast of the captured digital image is below a predetermined threshold value, the selected theme comprises one more characteristics selected from the group consisting of: a bold font weight, a non-light font weight, high image contrast, high font contrast, a light background with a dark font, and a large font size.

10. The method according to claim 1, wherein, if the analysis determines that one or more colour discrepancies between the captured digital image and the test image are above a predetermined threshold value, the selected theme is based on the one or more colour discrepancies.

11. The method according to claim 1, wherein capturing a digital image comprises using an internal camera.

12. The method according to claim 1, further comprising displaying the test image on the external display.

13. An electronic device for generating a presentation in accordance with a theme, wherein the presentation comprises at least one arrangement of graphic elements, and the theme defines the graphical appearance and layout of the graphic elements of the presentation, the device comprising:
one or more processors; and,
memory comprising instructions which, when executed by one or more of the processors, cause the electronic device to:
generate a test image for display on an external display;
capture a digital image of the test image displayed on the external display;
digitally analyse the captured digital image to identify properties of the external display;
select the theme for the presentation based on the analysis, wherein the selected theme individually alters the graphical appearance and layout of one or more graphic elements of the presentation, to improve the visibility of individual graphic elements when displayed on an external display with the identified properties; and,
generate the presentation in accordance with the selected theme.

14. The electronic device according to claim 13, wherein the presentation comprises a plurality of graphic elements of the same type, and wherein the theme defines the graphical appearance and layout of graphic elements independently of other content items of the same type.

15. The electronic device according to claim 13, wherein the presentation is not previously associated with a theme.

16. The electronic device according to claim 13, wherein selecting a theme comprises modifying a theme previously associated with the presentation.

17. The electronic device according to claim 13, wherein the theme comprises one or more characteristics, wherein each characteristic defines an aspect of the graphical appearance and layout of one or more graphic elements of the presentation, and wherein the one or more characteristics are selected from the group consisting of: type face, font weight, font size, font colour, image contrast, image saturation, font contrast, font saturation, background colour, background effect, slide transition, and slide animation.

18. The electronic device according to claim 13, wherein the test image comprises one of: a black and white image: red, blue and green regions; one or more geometric shapes; and
a marker positioned substantially in each corner of the image.

19. The electronic device according to claim 13, wherein the analysis comprises determining image sharpness of the captured digital image.

20. An electronic device according to claim 13, wherein, if the analysis determines that the image sharpness is below a predetermined threshold value, the selected theme is comprises a large font size suitable for the text to be readable.

21. An electronic device according to claim 13, wherein, if the analysis determines that the captured digital image has contrast below a predetermined threshold value, the selected theme is comprises one or more characteristics selected from the group consisting of: a bold font weight, a non-light font weight, high image contrast, high font contrast, a light background with a dark font, and a large font size.

22. An electronic device according to claim 13, wherein, if the analysis determines that one or more colour discrepancies between the captured image and the test image are above a predetermined threshold value, the selected theme compensates for the one or more colour discrepancies.

23. An electronic device according to claim 13, wherein the device comprises a camera, and wherein the device is adapted to capture the digital image using the camera.

24. An electronic device according to claim 13, wherein the device is adapted to display the test image on an external display.

25. A computer program product for generating a presentation in accordance with a theme, wherein the presentation comprises at least one arrangement of graphic elements, and the theme defines the graphical appearance and layout of the graphic elements of the presentation, the computer program product comprising a memory device comprising instructions which when executed by one or more of the processors of an electronic device cause the electronic device to:
generate a test image for display on an external display;
capture a digital image of the test image displayed on the external display;
digitally analyse the captured digital image to identify properties of the external display;
select the theme for the presentation based on the analysis, wherein the selected theme individually alters the graphical appearance and layout of one or more graphic elements of the presentation, to improve the visibility of individual graphic elements when displayed on an external display with the identified properties; and,
generate the presentation in accordance with the selected theme.

* * * * *